Jan. 23, 1923.
A. C. WILSON.
FLYTRAP.
FILED AUG. 10, 1921.
1,442,918.
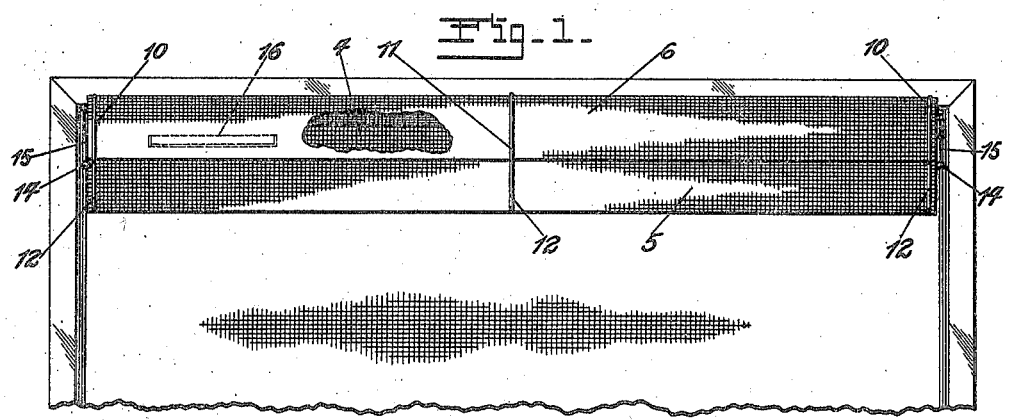
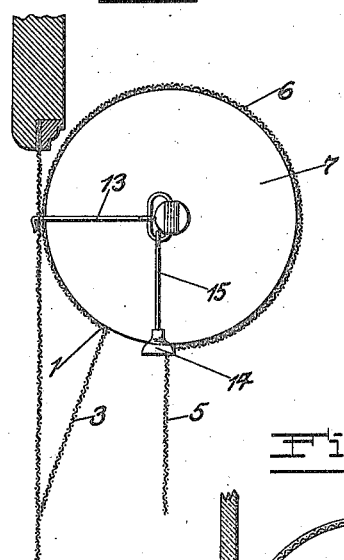
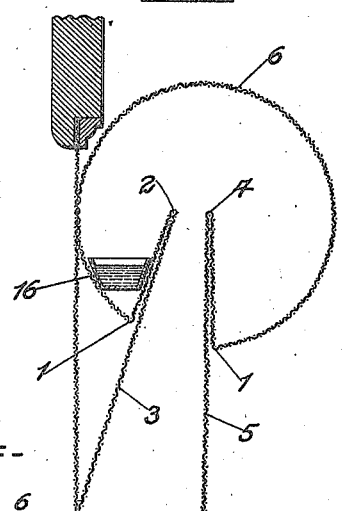
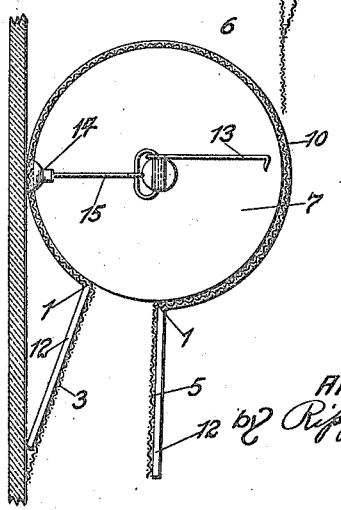
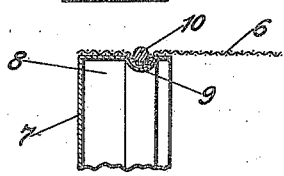
Inventor:
Alfred C. Wilson,
by Rippey & Kingsland,
His Attorneys.

Patented Jan. 23, 1923.

1,442,918

UNITED STATES PATENT OFFICE.

ALFRED C. WILSON, OF WEBSTER GROVES, MISSOURI.

FLYTRAP.

Application filed August 10, 1921. Serial No. 491,062.

*To all whom it may concern:*

Be it known that I, ALFRED C. WILSON, a citizen of the United States, residing at Webster Groves, Missouri, have invented a new and useful Flytrap, of which the following is a specification.

This invention relates to fly traps.

An object of the invention is to provide a novel and improved fly trap, and means whereby the trap may be easily attached to a window screen or door screen.

Another object of the invention is to provide means whereby the trap may be attached directly to a window or to a door or other plane surface.

Another object of the invention is to provide an improved fly trap that may be manufactured inexpensively and sold to users for a small price, thereby providing an article of real commercial value and one that will appeal to the public because of the commercial advantages thereof.

Other objects of the invention will appear from the following description, reference being made to the drawing, in which, Fig. 1 is a side elevation of my improved trap in connection with a window screen.

Fig. 2 is an end elevation of the trap in connection with a window screen.

Fig. 3 is a cross sectional view.

Fig. 4 is an end elevation of the trap in connection with a window.

Fig. 5 is a sectional view showing details of the invention.

My improved trap comprises a piece or section of wire screen of appropriate dimensions. The piece or section may be cut from a larger piece or section of screen; or it may be made specially of the proper size so as to provide selvedged edges.

As shown, the screen is folded along the lines 1, parallel with the longitudinal edges. One of the portions provided by the folds is folded upon itself along the line 2 to provide a portion 3 adapted to serve as an incline upon which the flies pass into the trap. The portion formed by the other fold 1 is folded upon itself along the line 4 to provide a portion 5 adapted to serve as a canopy between which and the incline 3 the flies pass into the trap.

After the screen has been thus folded, the portion thereof between the folds 1 is rolled to form a substantially cylindrical trap 6 with inwardly extended folded portions spaced at their inner extremities to leave a passage for the flies to enter the trap; and with an incline 3 for contact with the door screen or window screen, or with the plane surface of the window as shown. The canopy 5 extends downwardly with its lower edge a considerable distance from the incline 3, as stated. Flies passing along the incline 3, following their natural tendency to ascend, will be guided or caused by the canopy 5 to pass into the trap.

Appropriate end closures are provided. As shown each end comprises a closure wall 7 having a circumferential flange 8 fitting within the end of the trap 6. The flange 8 of each end is pressed or swaged to form a circumferential channel or groove 9 into which the screen material is pressed by an open or split ring 10. The ring 10 being open or split may be readily removed and applied.

The intermediate portion of the trap 6 is encircled by a ring 11 which extends around the trap to the parts 3 and 5 respectively. The rings 10 and 11 have approximately radially extended ends 12 for engagement with said parts 3 and 5 to retain them in proper relative positions. An appropriate and preferred means for supporting the trap in connection with a window screen or door screen includes a hook 13 pivotally connected with the end 7 and adapted to be engaged with the supporting screen, as shown in Fig. 2.

An appropriate and preferred means for supporting the trap in connection with a window pane, or the like, comprises a vacuum cup 14 on an arm 15, pivotally supported by each end 7 of the trap. In use the vacuum cups are pressed against the surface of the window pane to exclude the air from between the cup and the glass, so that the cup will retain its engagement therewith.

If desired, an appropriate poison or insecticide may be maintained within the trap. For this purpose, a receptacle 16 may be employed. The receptacle 16, containing the poison or insecticide, may be placed in any appropriate position in the trap.

In making the trap, a piece or section of screen is folded along the lines 1 and along the lines 2 and 4, the double portions being pressed flat upon the intermediate portions 6 which lies flat. To form the trap intermediate portions 6 are curved or rolled to approximately annular form and the ring 7 is pressed thereon. The resiliency of the screen wire tends to restore the screen to its original flat position, so that the ring 11 holds the central portion of the trap in proper form. The extended portions 12 of the ring 11 hold the incline 3 and the canopy 5 in proper relative positions to maintain an inlet passage to the trap through which the flies may pass. Next, the end closures are inserted as described, and the rings 10 are placed around the body 6 of the trap and serve to press the screen of the body into the circumferential grooves or channels 9, while the extended portions 12 of the rings 10 hold the end portions of the incline 3 and the canopy 5 in their proper position.

The trap may then be secured to a window screen or to a door screen by engaging the hook ends of the arms 13 therewith; or the trap may be secured to a window or other plane surface by means of the vacuum cups 14.

Obviously, the trap may be applied to use in other positions than in connection with screens or windows, and I do not restrict myself to any specific method or place of use.

From the foregoing it is apparent that my invention obtains all of its intended objects and purposes. The trap is of simple and inexpensive construction and may be marketed at low cost. I do not restrict myself to unessential features, but what I claim and desire to secure by Letters Patent is:—

1. A fly trap, comprising a section of screen rolled to form a substantially cylindrical body and folded to provide inwardly extended portions spaced apart at their inner edges to form a space for the entrance of the flies, one of said inwardly extended portions being folded to provide an outwardly inclined portion and the other of said inwardly extended portions being folded to provide an outwardly extended canopy spaced from said inclined portion.

2. A fly trap, comprising a section of screen rolled to form a substantially cylindrical body and folded to provide inwardly extended portions spaced apart at their inner edges to form a space for the entrance of the flies, one of said inwardly extended portions being folded to provide an outwardly inclined portion, and the other of said inwardly extended portions being folded to provide an outwardly extended canopy spaced from said inclined portion, and removable devices holding said section of screen in the form stated.

3. A fly trap, comprising a section of screen rolled to form a substantially cylindrical body and folded to provide inwardly extended portions spaced apart at their inner edges to form a space for the entrance of the flies, one of said inwardly extended portions being folded to provide an outwardly inclined portion and the other of said inwardly extended portions being folded to provide an outwardly extended canopy spaced from said inclined portion, removable rings holding said section of screen in the form stated, and removable end closures closing the ends of the cylindrical body.

4. A fly trap, comprising a section of screen rolled to form a substantially cylindrical body and folded to provide inwardly extended portions spaced apart at their inner edges to form a space for the entrance of the flies, one of said inwardly extended portions being folded to provide an outwardly inclined portion and the other of said inwardly extended portions being folded to provide an outwardly extended canopy spaced from said inclined portion, a removable ring holding said section of screen in the form stated, removable end closures closing the ends of the cylindrical body, and removable rings holding the ends of the cylindrical body in connection with said end closures.

5. A fly trap, comprising a section of screen rolled to form a substantially cylindrical body and folded to provide inwardly extended portions spaced apart at their inner edges to form a space for the entrance of the flies, one of said inwardly extended portions being folded to provide an outwardly inclined portion and the other of said inwardly extended portions being folded to provide an outwardly extended canopy spaced from said inclined portion, a removable ring holding said section of screen in the form stated, removable end closures closing the ends of the cylindrical body, removable rings holding the ends of the cylindrical body in connection with said end closures, and means in connection with said end closures for supporting the trap in connection with the window screen or door screen.

6. A fly trap, comprising a section of screen rolled to form a substantially cylindrical body and folded to provide inwardly extended portions spaced apart at their inner edges to form a space for the entrance of the flies, one of said inwardly extended portions being folded to provide an outwardly inclined portion and the other of said inwardly extended portions being folded to provide an outwardly extended canopy spaced from said inclined portion, a removable ring encircling said cylindrical body, extended portions on said ring engaging said inclined portion and said canopy, removable end closures closing the ends of the cylindrical body, removable rings holding the ends of the cylindrical body in connection with said end closures, and means in connection with said end closures for supporting the trap in connection with the window screen or door screen.

ALFRED C. WILSON.